US012624710B2

(12) United States Patent
Reitzig

(10) Patent No.: US 12,624,710 B2
(45) Date of Patent: May 12, 2026

(54) PNEUMOHYDRAULIC PRESSURE INTENSIFIER

(71) Applicant: WS Wieländer + Schill Engineering GmbH & Co. KG, Tuningen (DE)

(72) Inventor: Klaus Reitzig, Lüdenscheid (DE)

(73) Assignee: WS Wieländer + Schill Engineering GmbH & Co. KG, Tuningen (DE)

( * ) Notice: Subject to any disclaimer, the term of this patent is extended or adjusted under 35 U.S.C. 154(b) by 0 days.

(21) Appl. No.: 18/994,652

(22) PCT Filed: Sep. 8, 2023

(86) PCT No.: PCT/EP2023/074749
§ 371 (c)(1),
(2) Date: Jan. 15, 2025

(87) PCT Pub. No.: WO2024/056545
PCT Pub. Date: Mar. 21, 2024

(65) Prior Publication Data
US 2026/0022711 A1 Jan. 22, 2026

(30) Foreign Application Priority Data
Sep. 12, 2022 (DE) ..................... 10 2022 123 098.8

(51) Int. Cl.

| | |
|---|---|
| ***F04F 13/00*** | (2009.01) |
| ***B25F 5/00*** | (2006.01) |
| *B21J 15/10* | (2006.01) |
| *B21J 15/22* | (2006.01) |
| *B25B 27/02* | (2006.01) |

(52) U.S. Cl.
CPC .............. *F04F 13/00* (2013.01); *B25F 5/005* (2013.01); *B21J 15/105* (2013.01); *B21J 15/22* (2013.01); *B25B 27/026* (2013.01)

(58) Field of Classification Search
CPC ...... F15B 3/00; F15B 11/032; F15B 11/0325; F15B 11/072; F15B 11/0725; F15B 2211/216; B25F 5/00; B25F 5/005; B21J 15/105; B21J 15/22; B25B 27/026; F04B 25/005
See application file for complete search history.

(56) References Cited

U.S. PATENT DOCUMENTS

2023/0143865 A1* 5/2023 Flatt .......................... F04B 9/08
60/412

FOREIGN PATENT DOCUMENTS

| | | | |
|---|---|---|---|
| DE | 70011 | | 11/1969 |
| DE | 102011111533 | A1 | 2/2013 |
| EP | 3360648 | A1 | 8/2018 |

* cited by examiner

*Primary Examiner* — Loren C Edwards
(74) *Attorney, Agent, or Firm* — Smartpat PLC

(57) ABSTRACT

A pneumohydraulic pressure intensifier includes at least one pneumatic piston that is coupled to a hydraulic pump. The pressure intensifier includes a regulator which allows to set the hydraulic output pressure. The regulator is coupled to a hydraulic pilot control valve which is adapted to interrupt the air supply to the pneumatic piston when a set maximum pressure is reached.

12 Claims, 15 Drawing Sheets

PNEUMOHYDRAULIC PRESSURE INTENSIFIER

CROSS-REFERENCE TO RELATED APPLICATION

This application is a national stage application, filed under 35 U.S.C. § 371, of International Patent Application PCT/EP2023/074749, filed on Sep. 8, 2023, which claims the benefit of German Patent Application DE 10 2022 123 098.8, filed on Sep. 12, 2022.

TECHNICAL FIELD

The disclosure relates to a pneumohydraulic pressure intensifier. More particularly, the disclosure relates to a pneumohydraulic pressure intensifier which comes in the form of a hand-held device and drives a pressing or pulling device, in particular a riveting, punching or crimping device.

BACKGROUND

Pneumohydraulic pressure intensifiers have been known for generating high pressing and pulling forces. In particular, pressure intensifiers are known which oscillate and drive a hydraulic pump using a suction valve and a pressure valve and thus drive a hydraulic tool. Such a device can be compact and yet generate very high forces.

Patent EP 3 360 648 B1 (inventor Klaus Reitzig) discloses such a pneumohydraulic pressure intensifier. In order to increase performance, this pressure intensifier comprises a tandem piston. A pneumohydraulic pressure intensifier is also known from published patent application DD 70 011 A1.

In particular if such a pressure intensifier is used for a modular system encompassing various tool attachments, it is necessary to set the maximum pressure of the pressure intensifier. The set maximum pressure is proportional to the pressing or pulling force of the tool. For example, in the case of a riveting tool, the pulling or pressing force has to be set to a specific value depending on the rivet used and the sheet metal pairing provided.

In the case of the pressure intensifier described in the above-mentioned patent, this is done using a pneumatic pressure control. The applied pneumatic pressure is set on the pneumatic side of the pressure intensifier. The pneumatic pressure is proportional to the hydraulic pressure. The hydraulic pressure therefore corresponds to the pneumatic pressure multiplied by the transmission ratio of the pressure intensifier. The transmission ratio is the effective piston area of the pneumatic piston(s) to the effective piston area of the hydraulic piston.

Therefore, the hydraulic pressure and thus the maximum pressing or pulling force can be adjusted proportionally by reducing the pneumatic pressure.

A pneumatic pressure reducer is designed in particular as an upstream pressure limiter. However, with such a pressure limiter, the volume flow of compressed air decreases when the pressure on the outlet side approaches the set maximum pressure.

It has been found that this reduces the performance of the pneumohydraulic pressure intensifier. More particularly, the tool works more slowly towards the end of the working operation. In particular the oscillation frequency of the hydraulic pump may also reduce.

SUMMARY

The present disclosure is based on the object of further enhancing the performance of a pressure intensifier which is used in particular as a drive for hydraulically operated tools.

The object is achieved by a pneumohydraulic pressure intensifier as disclosed and claimed.

The invention relates to a pneumohydraulic pressure intensifier. This pressure intensifier in particular forms part of a pulling or pressing tool, in particular a riveting tool, punching tool, crimping or cutting tool. For being connected to a tool application, the pressure intensifier may comprise a quick release coupling. The pressure intensifier can come in the form of a hand-held device, but also as a stationary device.

The pressure intensifier comprises at least one pneumatic piston which is coupled to a hydraulic pump. The pressure intensifier works in particular in an oscillating manner. For this purpose, the hydraulic pump may comprise a suction valve and a pressure valve. With each working stroke of the pneumatic piston, a hydraulic piston coupled to the pneumatic piston pumps hydraulic fluid. When the piston is reset, a suction valve draws hydraulic fluid into the working chamber of the hydraulic piston, which hydraulic fluid will be pumped towards the tool application during the next working stroke.

The hydraulic output pressure of the pressure intensifier can be limited. This may be implemented, for example, using a control member, e.g. a setting wheel. Via a regulator, this allows to set the pressure force or pulling force of the tool application connected to the pressure intensifier, as described above.

The regulator is coupled to a hydraulic pilot control valve, which is adapted to interrupt the air supply to the pneumatic piston when a set maximum pressure is reached.

Thus, the applied pneumatic pressure is not only set on the pneumatic side. Rather, it is contemplated that the regulator allows to set the trigger pressure of a hydraulic valve. The hydraulic valve in turn is coupled to a pneumatic control valve which interrupts the air supply to the pneumatic piston when the set maximum pressure is reached.

An input-side pneumatic valve, in particular a main valve, can thus remain fully open during the entire working operation. When the maximum pressure is reached, the air supply to the pneumatic piston will be interrupted via a pneumatic control line which is coupled to the pilot control valve.

This allows the tool to operate at full power until the end of the working operation. Also, in particular the frequency of the hydraulic pump can remain essentially constant.

The main valve may come in the form of a 5/2-way or a 5/3-way valve, for example.

According to a refinement, it is in particular contemplated for the main valve to be designed in such a way that two stages are available when a trigger is pressed.

In a first stage, pneumatic pressure is first applied to the hydraulic area without the hydraulic pump operating.

This first stage may thus be used for fast forward, in which the working piston of the tool application is advanced according to the pressure of the applied compressed air.

Thereafter, in a second switching stage, the air supply to the pneumatic piston is opened, thereby starting the pneumohydraulic pump.

According to a further aspect, the disclosure relates to a pneumohydraulic pressure intensifier, in particular as described above.

This pressure intensifier comprises a pneumatic piston that is coupled to a hydraulic pump. The hydraulic pump feeds hydraulic fluid when the pneumatic piston is advanced. The hydraulic pump in particular works in an oscillating manner as described above and comprises a pressure valve and a suction valve.

Furthermore, the at least one pneumatic piston can be reset by pneumatic pressure via a control valve.

The pneumatic piston is therefore not reset by means of a spring, but by compressed air. More particularly, it is contemplated for the control valve to comprise a tappet that is actuated by the pneumatic piston and then opens a passage through which compressed air flows into the working chamber to reset the pneumatic piston.

In a preferred embodiment, the pressure intensifier comprises a tandem piston including a first piston and a second piston. In a working cycle, the first and second pistons are advanced by introduction of compressed air. More particularly, the compressed air is introduced into the working chamber of the second piston and fed through a passage that connects the first and second pistons to one another.

Thus, in a working cycle both pistons work in parallel and drive the hydraulic pump.

On the other hand, the tandem piston can be reset by introducing compressed air into the working chamber of only the first piston.

When the piston is reset, the hydraulic pump does not work. It is therefore sufficient to introduce compressed air into the working chamber of only one piston. This makes it easier to provide the device in a straightforward configuration.

Preferably, a pneumatic control module is arranged between the working chamber of the first piston and the working chamber of the second piston.

More particularly, it is contemplated for the pneumatic control module to comprise passages through which compressed air can be fed alternately into the working chamber of the first piston and into the working chamber of the second piston.

On the one hand, the compressed air is used for advancement to drive the hydraulic pump, in particular by both pistons, during a working cycle.

On the other hand, the feeding of compressed air into the other working chamber is used for resetting.

The control module may in particular comprise a respective control valve leading into the working chamber of a respective piston.

The control valve may in particular comprise a tappet which is actuated by the respective piston.

At the end of each of the working and reset cycles, the control valves allow to reverse the compressed air supply so that the compressed air will then flow into the respective other working chamber.

Such a system is self-stabilizing and operates at a frequency that is predetermined by the design. In particular, this frequency may range between 10 Hz and 30 Hz. It will be appreciated that the frequency depends on the moving masses, the size of the working chambers, and the effective areas of the pistons involved, among other things.

The switching over of the compressed air supply to the working chambers can be achieved using a directional control valve, more particularly a 5/2-way valve. The directional control valve can be switched using control valves.

In particular, the directional control valve may comprise a slide valve, so that a respective control valve actuates a slide valve and thus switches over the compressed air supply from one working chamber to the other working chamber. Preferably, the slide valve also opens or closes an exhaust air passage. Thus, when the slide valve is switched over, the compressed air supply is opened for one working chamber and closed for the other one, and conversely, an exhaust air passage is closed for one working chamber and opened for the other one.

It is in particular contemplated that a central compressed air line leads to the slide valve and is alternately connected to the working chambers by the slide valve.

Control valves may actuate the slide valve mechanically, for example. Preferably, however, the control valves actuate the slide valve pneumatically. Such pneumatic actuation is low-wear and reliable.

The control valves may in particular be in the form of 2/2-way or 3/2-way valves, which are respectively actuated by the piston moving in the working chamber.

BRIEF DESCRIPTION OF THE DRAWINGS

The subject-matter of the invention will be explained in more detail below by way of an exemplary embodiment and with reference to the drawings of FIGS. 1 through 13.

DETAILED DESCRIPTION

Figure 1:
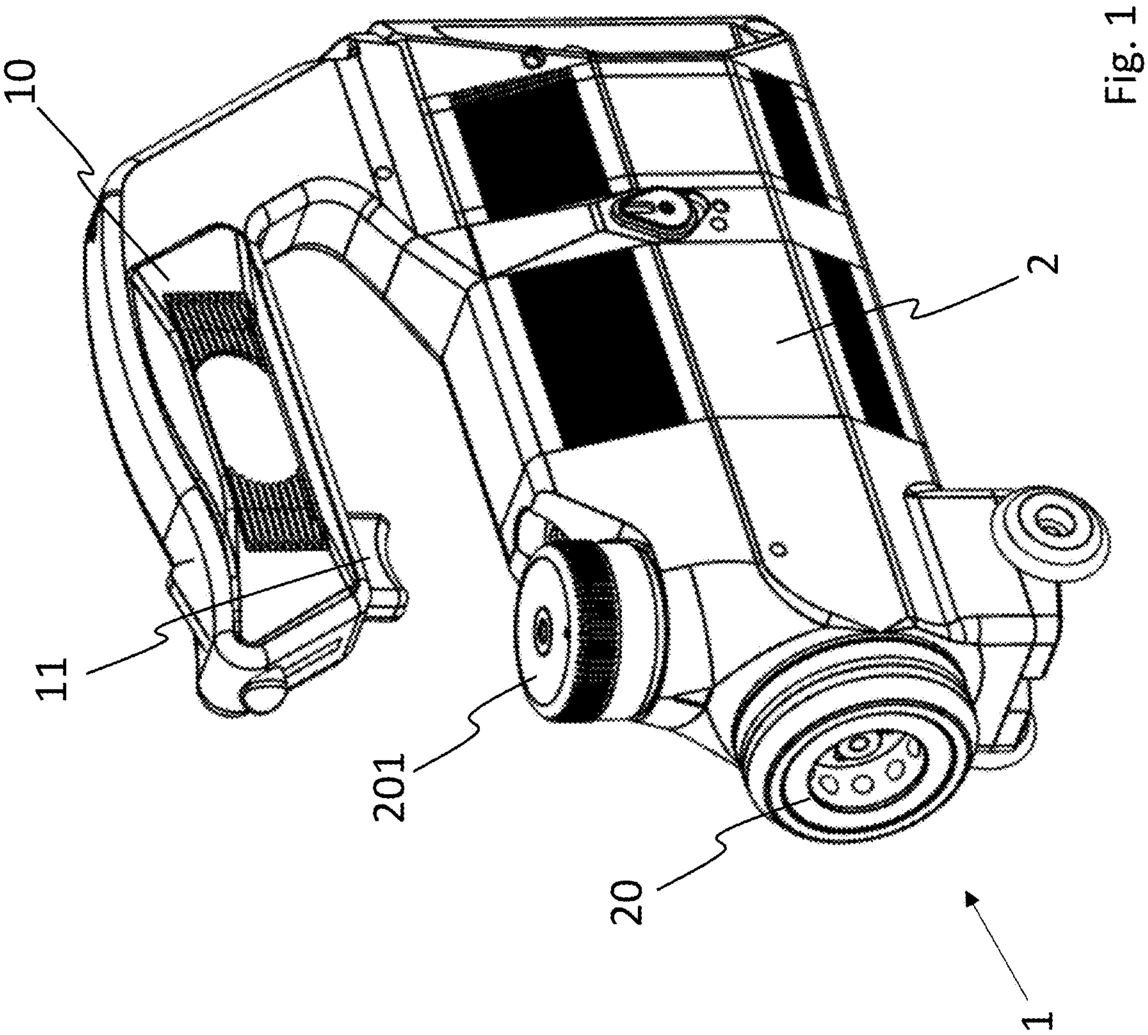
FIG. 1 is a perspective view of a pressure intensifier.

FIG. 1 is a perspective view showing one exemplary embodiment of a pressure intensifier 1.

The pressure intensifier 1 comes in the form of a portable hand-held device and comprises a housing 2 with a handle 10, on which the pressure intensifier can be lifted and which comprises a trigger 11 for initiating a working operation.

At the front, the housing 2 comprises a hydraulic quick release coupling 20. The hydraulic quick release coupling 20 is used to connect a tool application (see FIG. 15).

Furthermore, a control member 201 is provided on the housing 2. In this exemplary embodiment, the control member 201 is in the form of a rotary wheel and serves as a regulator for setting the maximum working pressure. The control member 201 allows to set the pulling or pressing force of the tool application. This force is proportional to the hydraulic pressure generated by the pressure intensifier 1.

Figure 2:
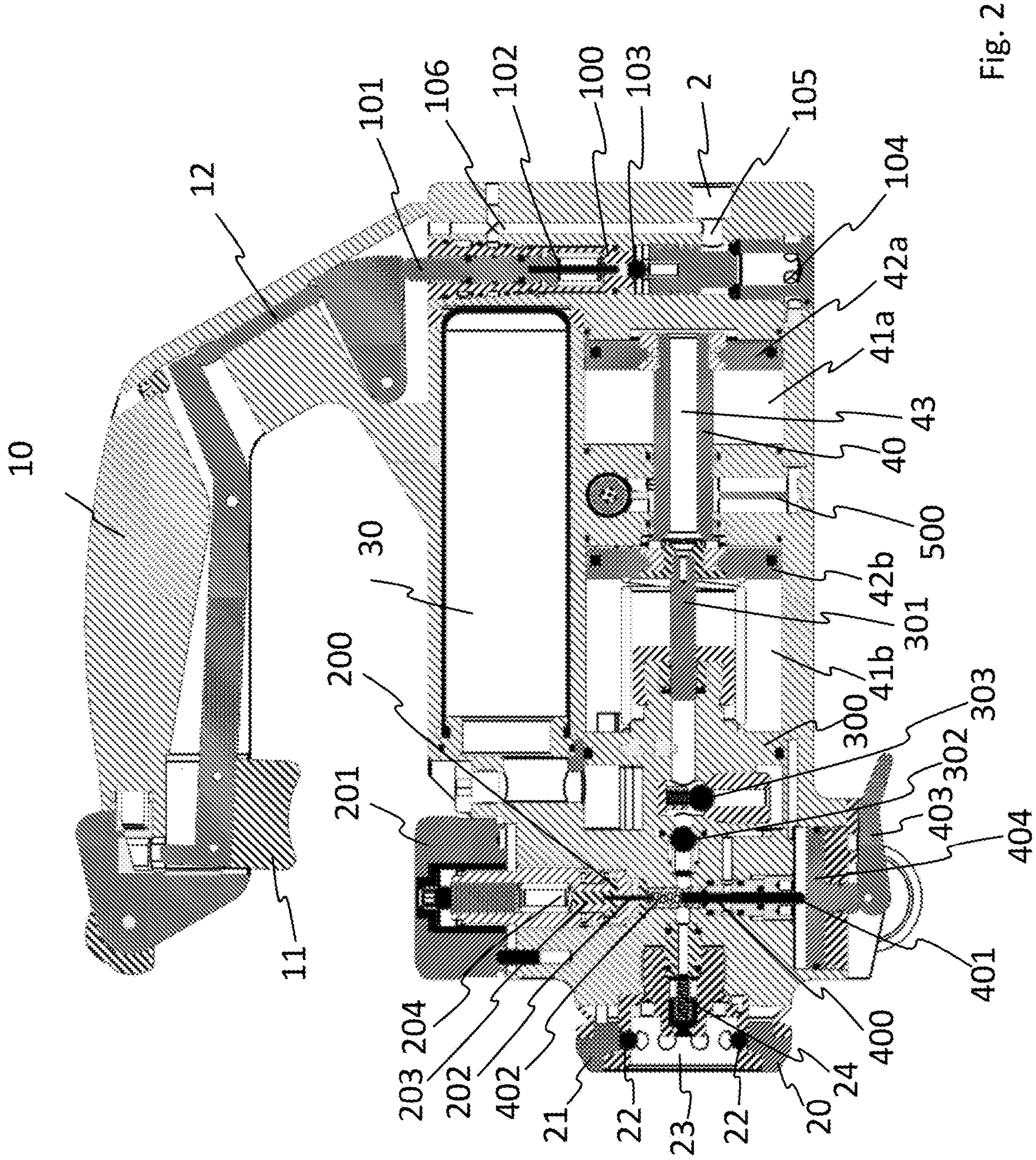
FIG. 2 is a central longitudinal sectional view.

FIG. 2 is a central longitudinal sectional view of the pressure intensifier 1.

The trigger 11 on handle 10 actuates, via a linkage 12, the pin 101 of a main valve 100 in order to initiate a working operation.

The quick release coupling 20 comprises balls 22 as engagement elements for holding the tool application.

In the locked state, the balls 22 protrude through the openings of a cage 23.

The quick release coupling 20 can be opened using a spring-mounted and axially displaceable locking ring 21.

Furthermore, the quick release coupling 20 comprises a self-closing hydraulic valve 24.

In the present exemplary embodiment, a working operation is initiated in two stages. This is controlled via the main valve 100 which is preferably in the form of a 5/3-way valve.

When the user actuates the trigger 11 into a first stage, a pin 101 of the main valve 100 is pushed downwards in such a way that first the control line 106 is opened for fast forward. The control line 106 applies pneumatic pressure to a diaphragm 30 that is filled with hydraulic fluid.

Now, a pressure which is applied in the hydraulic area, in particular at the quick release coupling, corresponds to the pressure of the compressed air to which the pressure intensifier 1 is connected at the pneumatic connection 3. The tool application can thus be moved into position without initiating a working operation.

When the user presses the trigger 11 into the second stage, the main valve 100 will be actuated via the valve body 102 such that compressed air flows from the inlet 105 via the outlet 104 to the piston control 500.

The pressure intensifier 1 shown here comprises a tandem piston 40 with two working chambers 41*a*, 41*b*, which are separated from each other by the piston control 500.

The pistons 42*a*, 42*b* are coupled to each other via a connecting passage 43.

The tandem piston 40 drives a hydraulic piston 301 of the hydraulic pump 300. The transmission ratio of the effective piston area of the hydraulic piston 301 to that of the pneumatic pistons 42*a*, 42*b* is preferably greater than 100, in particular between 120 and 200. In this way, correspondingly high hydraulic pressures can be generated.

At the same time, a large volume of hydraulic fluid, in particular more than 50 $cm^3$, preferably from 80 to 500 $cm^3$, is provided by the diaphragm 30 inter alia.

In the present exemplary embodiment, the hydraulic pump 300 is in the form of a single stage pump.

The hydraulic pump 300 comprises a pressure valve 302 and a suction valve 303. When the hydraulic piston 301 is advanced, the pressure valve 302 opens and feeds hydraulic fluid towards the tool application.

When the hydraulic piston 301 is retracted, the pressure valve 302 closes the passage. At the same time, hydraulic fluid flows into the working chamber of the hydraulic piston 301 through suction valve 303. It will be fed forward during the next working stroke.

The pressure intensifier 1 illustrated here is designed for two-handed operation and for this purpose comprises a lever 403 which the user must turn in order to initiate a working operation. At the end of a working operation, a relief valve 400 opens, which opens a bypass that can only be closed again by turning the lever 403, which is designed as an eccentric lever.

The relief valve comprises the spring 402 on which the valve body 400 is supported, which rests on a piston 404. The piston 404, in turn, is coupled to the lever 403 and can be moved against the spring force via the eccentric.

As already mentioned above, the maximum pressure is set using the control member 201.

The pilot control valve 200 serves to adjust the working pressure.

Pilot control valve 200 comprises a pin 202 which protrudes into the hydraulic area.

In the present exemplary embodiment, relief valve 400 and pilot control valve 200 share a common passage. This simplifies the manufacture of the tool. However, pilot control valve 200 and relief valve 400 are otherwise independent in their function.

The pin 202 is connected to a base 203 which is part of a pneumatic control valve. The base 203 is supported on the spring 204. By turning the control member 201, the bias of the spring 204 can be changed, and in this way the hydraulic pressure can be set at which the pin 202 starts to press the base 203 towards the control member 201, thus closing the pilot control valve 200.

In the present exemplary embodiment, the pilot control valve 200 is closed to stop the working operation. According to another embodiment, however, it is also possible for a pilot control valve to be opened.

As will be explained in more detail further below, the pilot control valve 200 is coupled to the main valve 100 via a pneumatic line. When the pilot control valve 200 is triggered, the main valve 100 stops the compressed air supply to the piston control 500 and thus stops the working operation.

Figure 3:
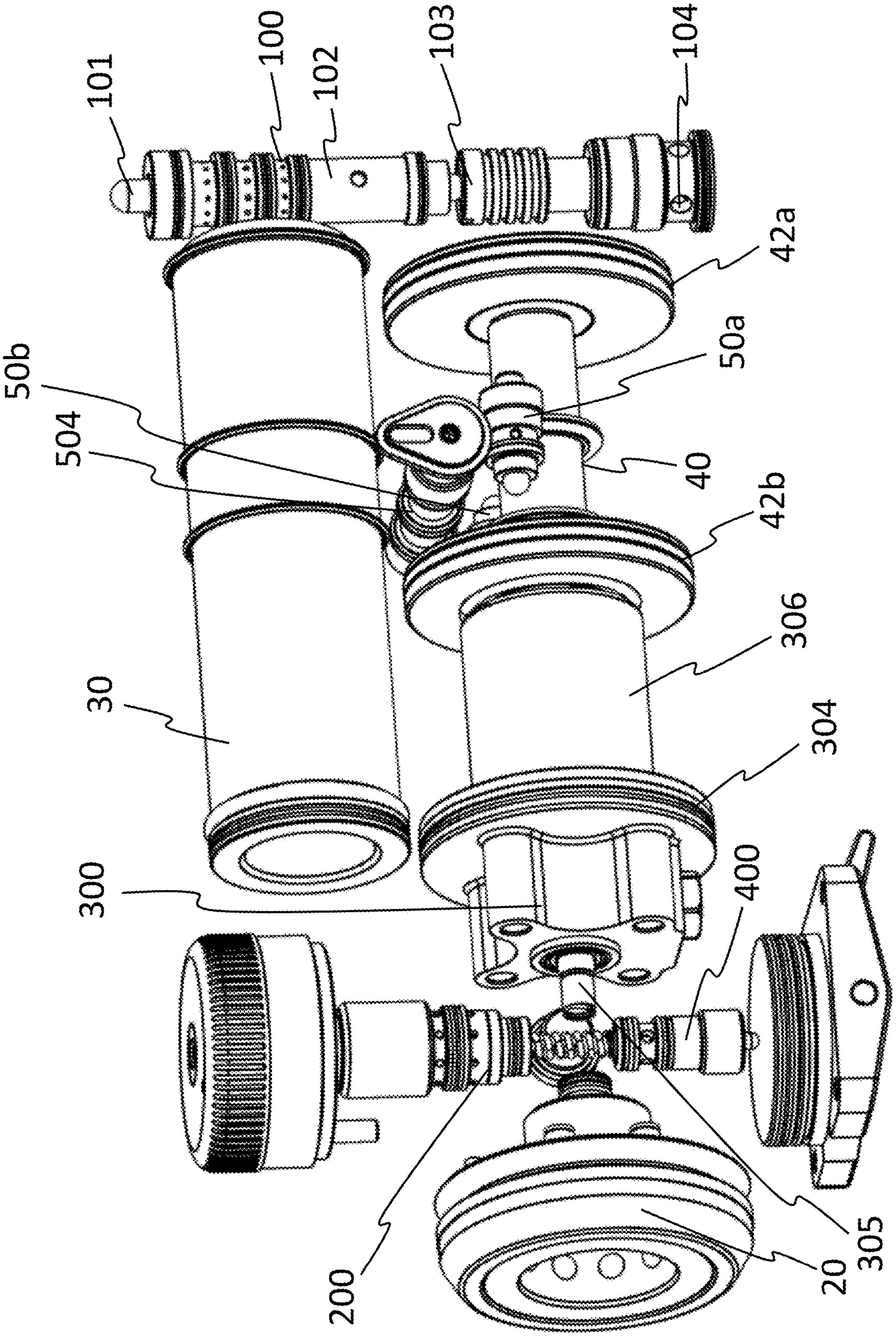
FIG. 3 shows the pressure intensifier with the housing omitted.

FIG. 3 is a perspective view of the pressure intensifier 1 with housing components omitted.

Illustrated here are the pilot control valve 200 and the relief valve 400, which share a common hydraulic passage.

The hydraulic pump 300 comprises a hydraulic line 305 at the front, which leads to the quick release coupling 20. Furthermore, the hydraulic pump 300 comprises a cover 304 which closes the working chamber of the piston 42*b*. A diaphragm 306 which provides additional hydraulic fluid may be provided in the working chamber of the piston 42*b*.

Between the two pistons 42*a*, 42*b* of tandem piston 40, there are two control valves 50*a*, 50*b* in the piston control (500 in FIG. 2) as well as a directional control valve in the form of a slide valve 504 which allows compressed air to alternately flow into the two working chambers.

The main valve 100 comprises the pin 101 as a trigger, a valve body 102, and a shut-off valve 103.

In the actuated state, compressed air flows from the outlet 104 towards the piston control.

Figure 4:
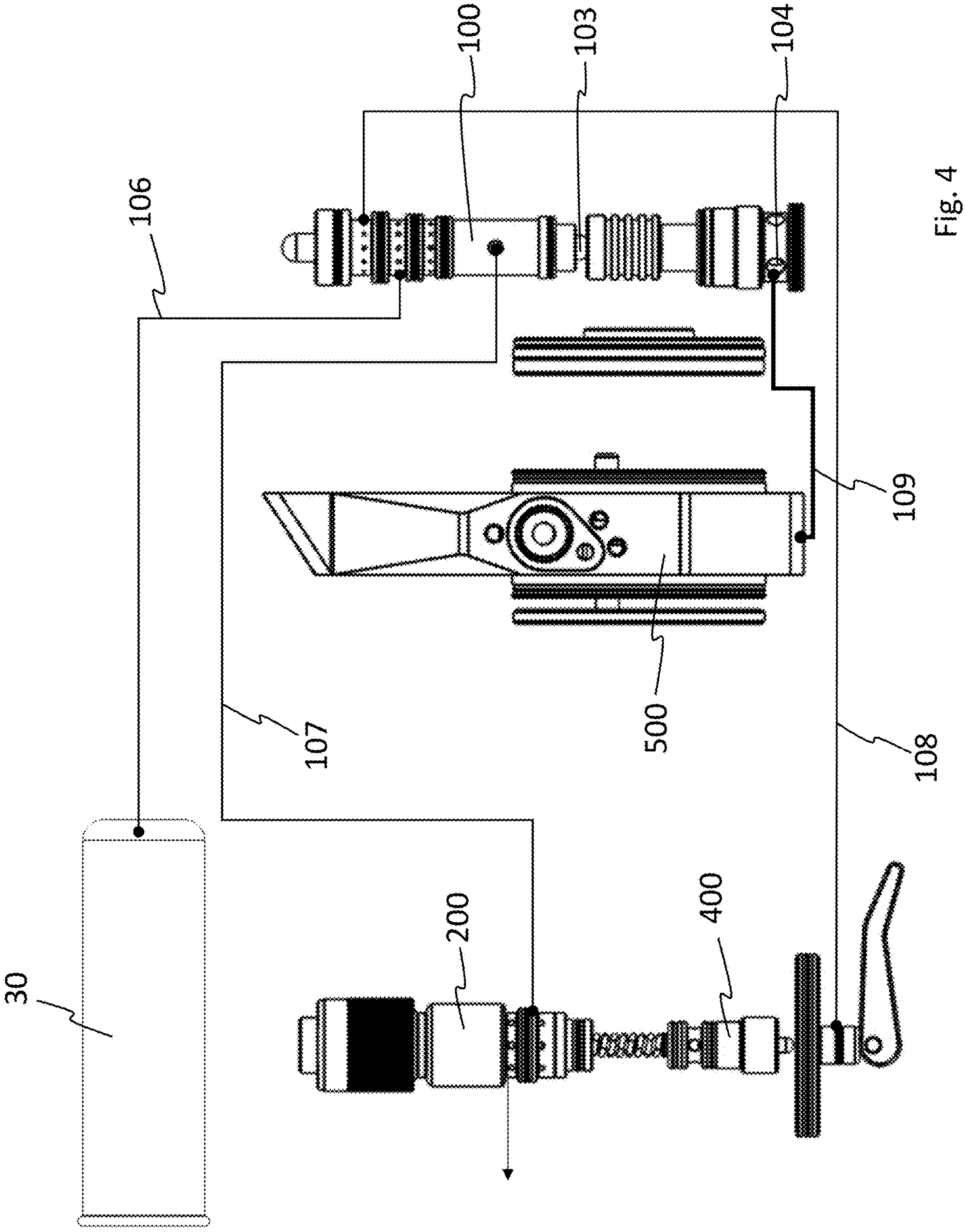
FIG. 4 is a pneumatic equivalent circuit diagram.

FIG. 4 is a pneumatic equivalent circuit diagram illustrating the lines coming from the main valve 100 and leading to the main valve 100.

The main valve 100 is coupled to the diaphragm 30 via a control line 106.

In a first stage, compressed air is fed into the working chamber of the diaphragm 30 via control line 106, thus subjecting the hydraulic area to the pressure of the applied compressed air.

Furthermore, the main valve 100 is coupled to the relief valve 400 via control line 108.

At the end of a working operation, the relief valve 400 opens a bypass, which has to be closed again in order to allow compressed air to flow to the piston control via the main valve 100.

The main valve 100 allows compressed air to flow to the piston control 500 via line 109 in order to perform a working operation.

Furthermore, a shut-off valve 103, which is part of the main valve 100, is coupled to the pilot control valve 200 via control line 107.

In the operating state shown here, the pilot control valve 200 is open and compressed air is constantly flowing out of the pilot control valve 200.

When the maximum pressure is reached, the pilot control valve 200 closes so that pressure builds up in the control line 107, which activates the shut-off valve 103 so that the compressed air supply via line 109 to the piston control 500 is interrupted.

Figure 5:
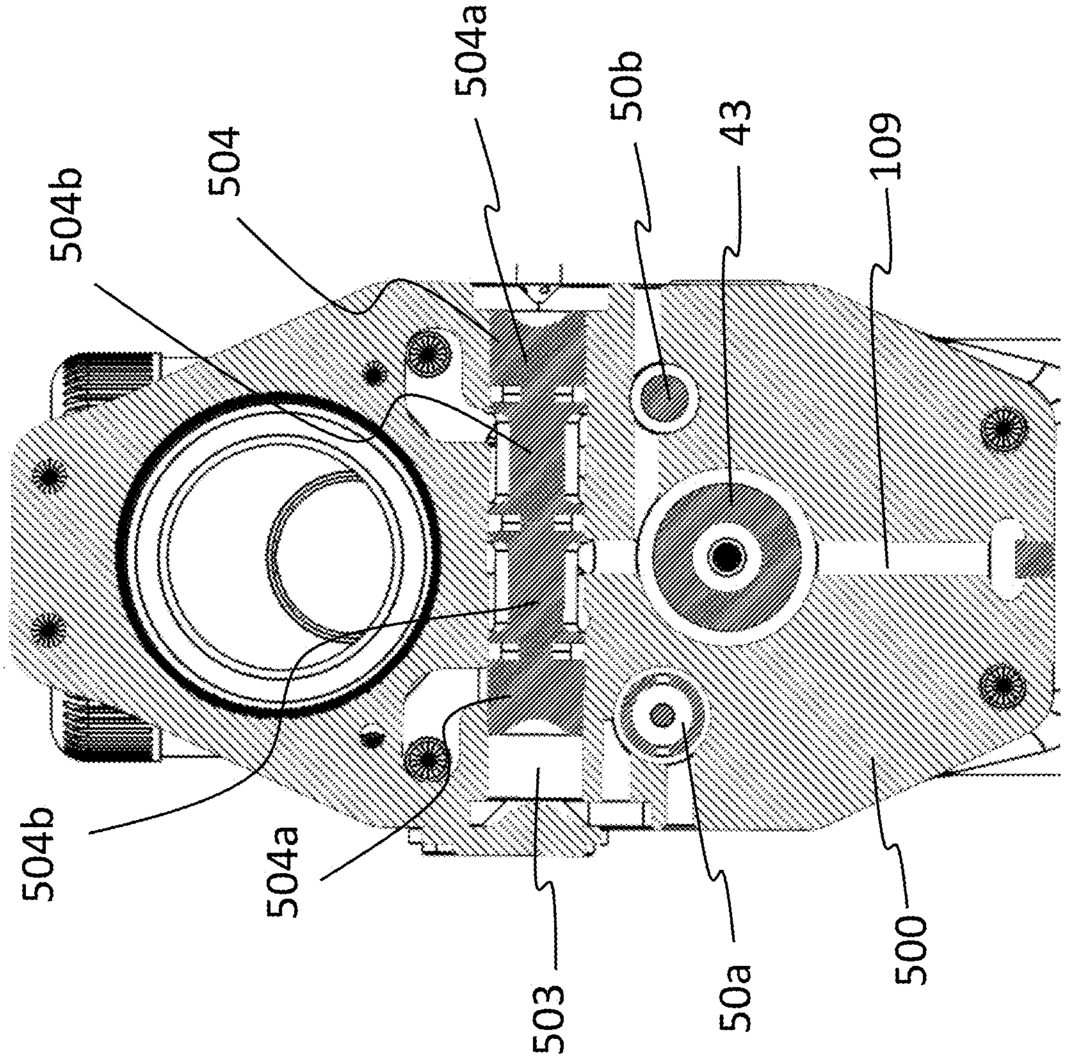
FIG. 5 is a cross-sectional view in the area of the slide valve of the piston control.

FIG. 5 is a cross-sectional view of the piston control 500. Piston control 500 comprises a plate which is arranged between the working chambers of the two pistons. In this exemplary embodiment, the line 109 is in part in the form of a central passage which leads to the working chamber 503 of a slide valve 504. The line 109 leads past the connecting passage 43 between the two pistons.

The control valves 50*a* and 50*b* move the slide valve 504 alternately to the left and right, thereby feeding compressed air into the working chamber 503 of the slide valve 504 alternately on the left and right side, respectively.

Slide valve 504 comprises sections 504*a* which serve to open or close the respective exhaust air passage. They may have a circular-cylindrical shape.

Sections 504*b* serve to open or close the respective passage leading to the working chamber of a piston. The sections 504*b* may be dumbbell-shaped. In this way, air can flow around a section 504*b*, which however is sealed at the ends against the working chamber 503 of the slide valve 504.

Figure 6:
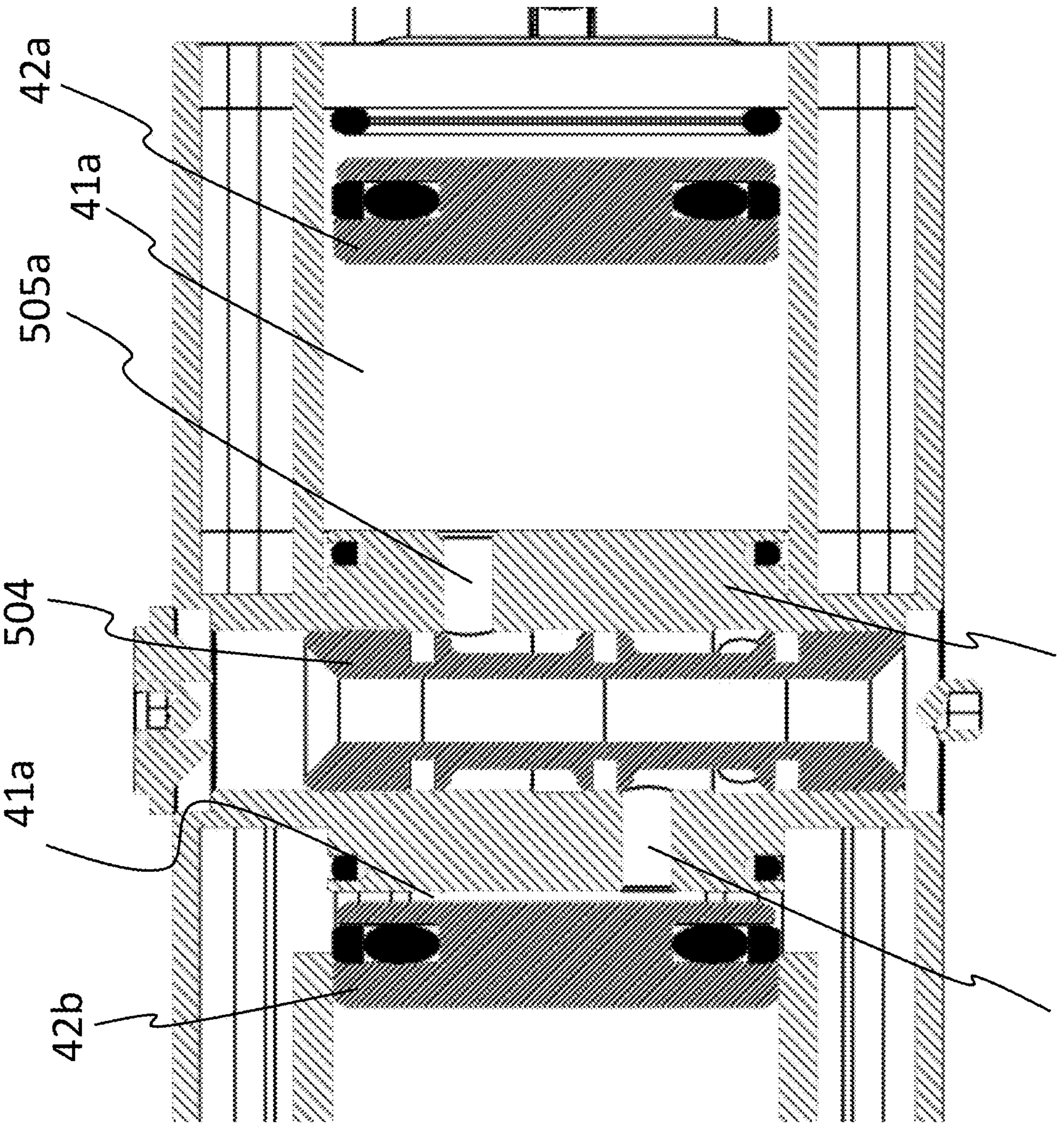
FIG. 6 is a longitudinal sectional view in the area of the slide valve of the piston control.

FIG. 6 is a central longitudinal sectional view in the area of the slide valve 504.

The housing of piston control 500 comprises the passage 505*a* which leads into the working chamber 41*a* of piston 42*a*, and the passage 505*b* which leads into the working chamber of piston 42*b*. Through slide valve 504, compressed air is alternately fed into one of the working chambers 41*a*, 41*b*.

Figure 7:
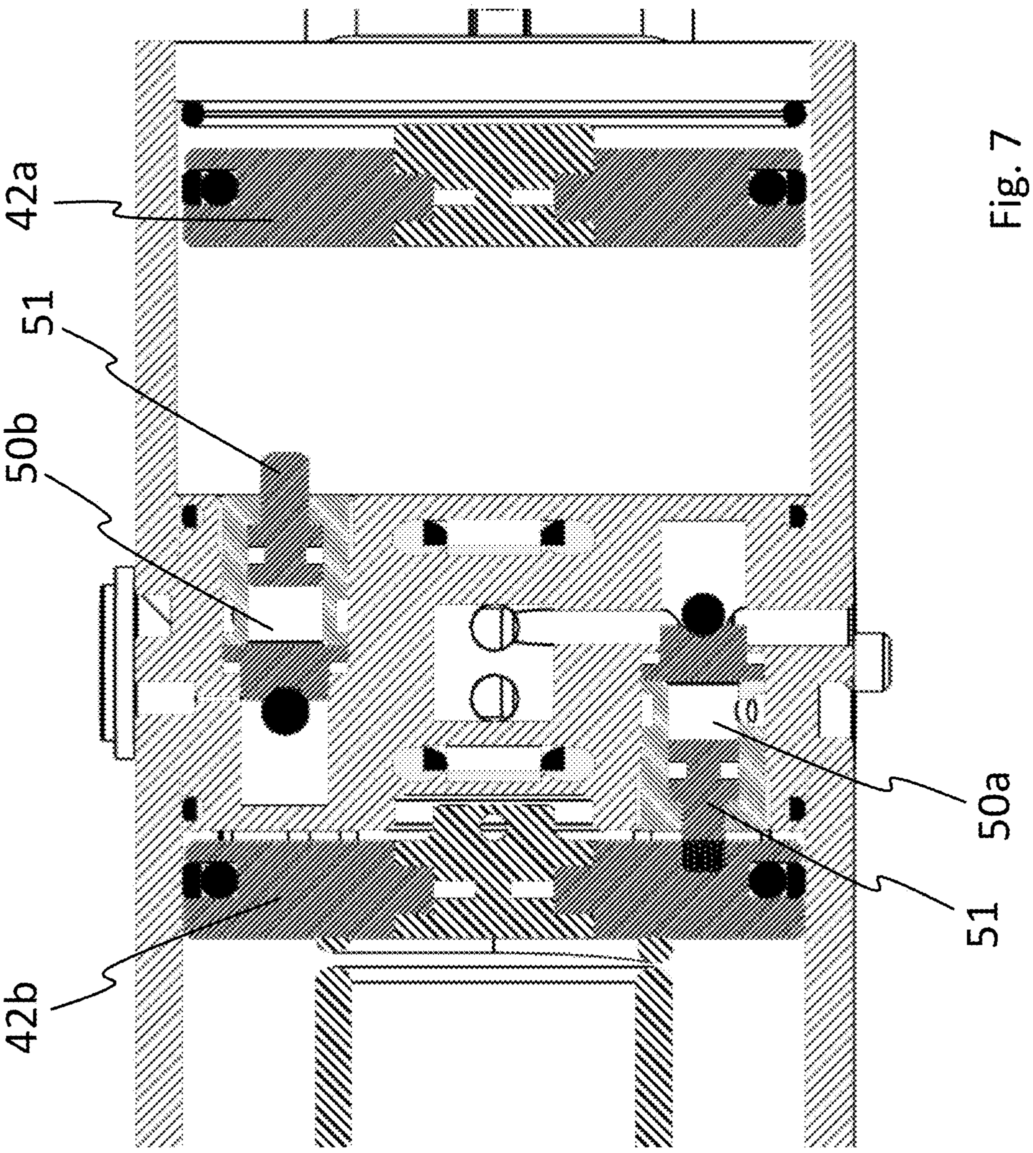
FIG. 7 is a longitudinal sectional view in the area of the control valves of the piston control.

FIG. 7 is a longitudinal sectional view in the area of the control valves.

Control valves 50*a*, 50*b* are alternately actuated by the pistons 42*a*, 42*b*, by virtue of the piston 42*a*, 42*b* hitting a respective tappet 51 of the control valve 50*a*, 50*b*.

In the present view, the pistons 42*a*, 42*b* are located just at the end of a reset process.

Control valve 50*a* is actuated. In this CAD view, however, the tappet 51 overlaps the piston 42*b* and is incorrectly depicted in the closed position.

Figure 8:
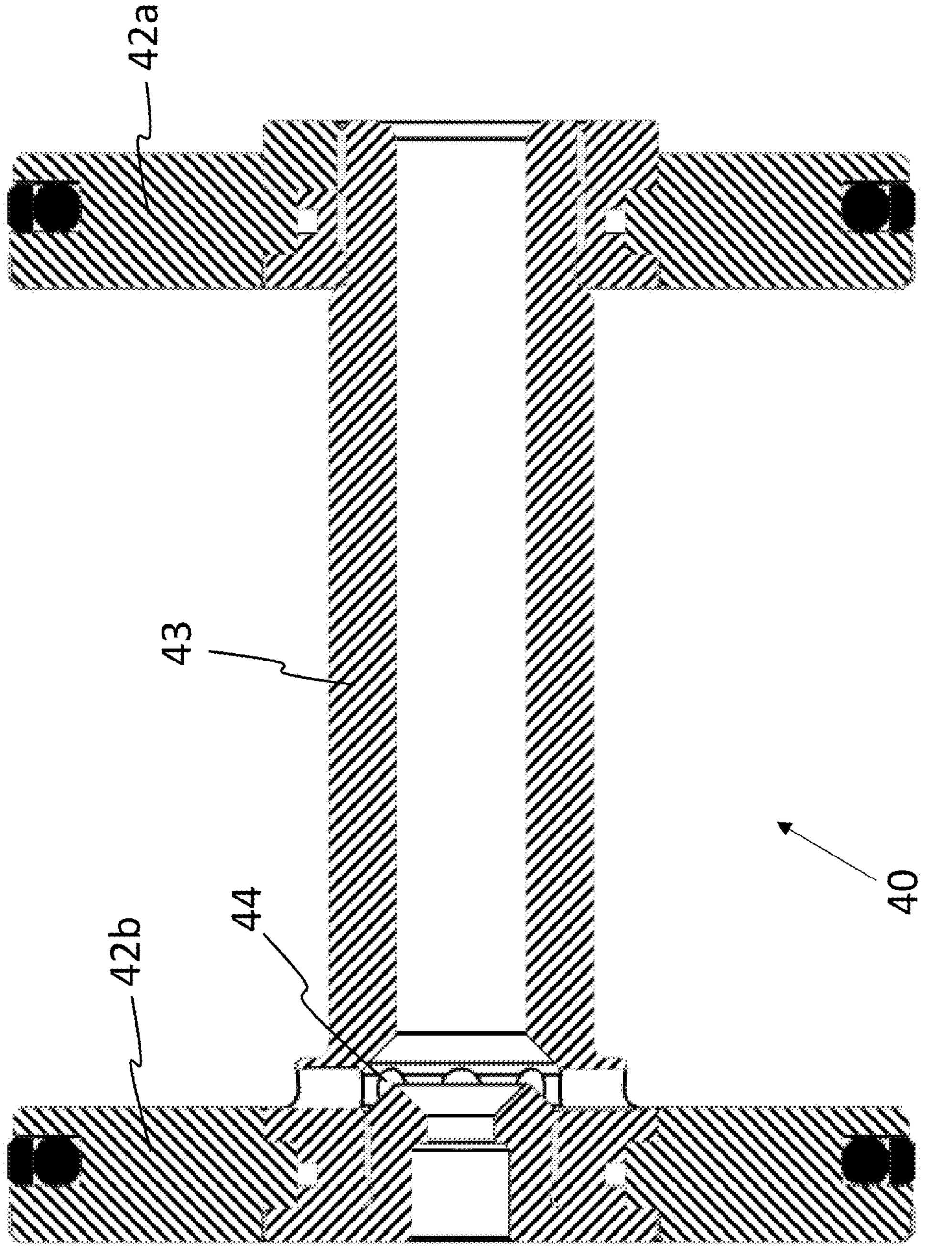
FIG. 8 is a longitudinal sectional view of the tandem piston.

FIG. 8 is a central longitudinal sectional view of the tandem piston 40.

The tandem piston comprises the connecting passage 43 via which the working chambers of the pistons are in communication with each other.

Air can flow into the connecting passage 43 via an inlet 44 which may, for example, comprise a plurality of bores, and can flow into the working chamber of piston 42 at the outlet 45. During a working operation, both pistons 42*a*, 42*b* will therefore move in the same direction.

Figure 9:
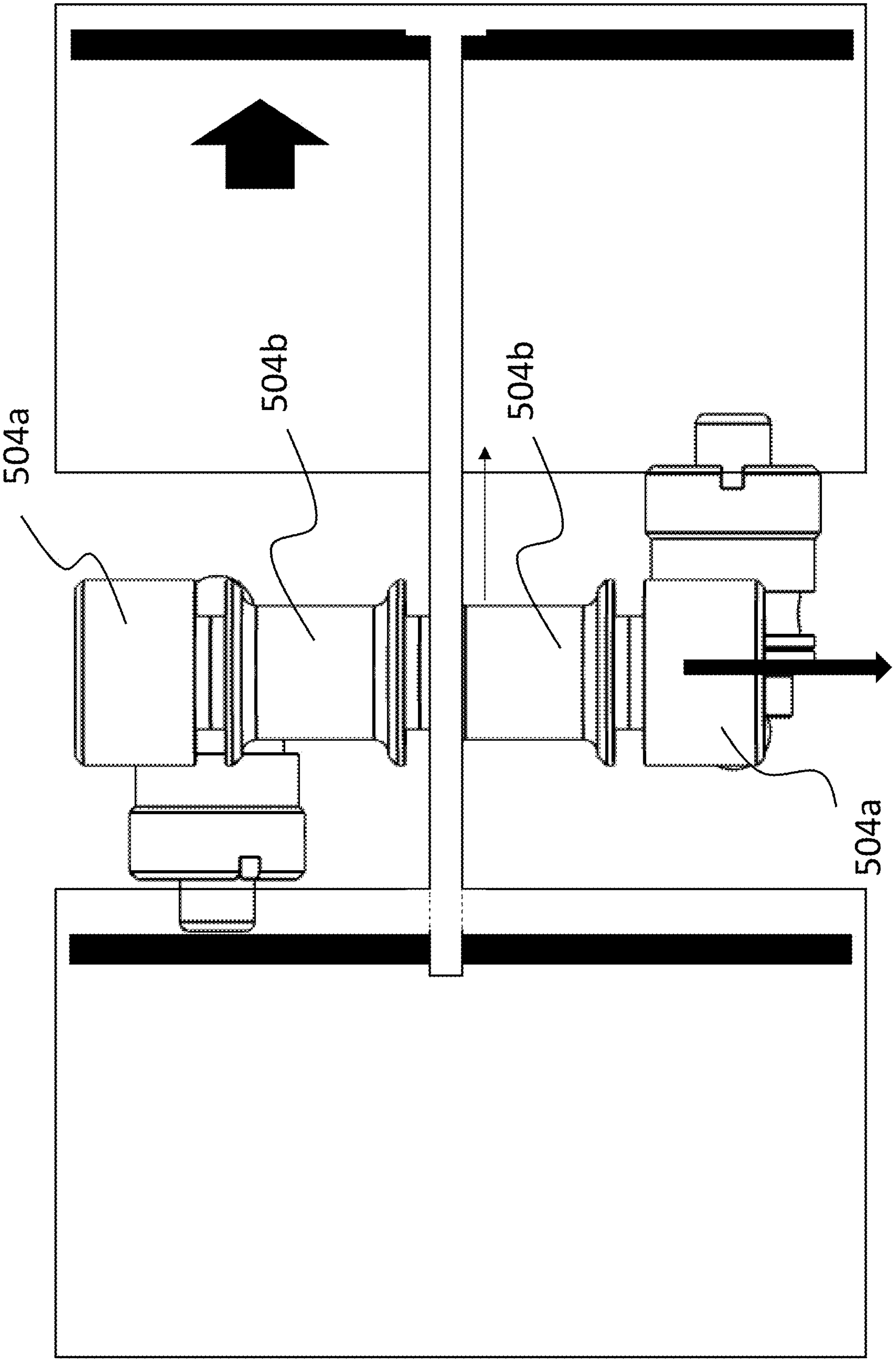
FIGS. 9 and 10 are schematic diagrams of the piston control.
Figure 10:
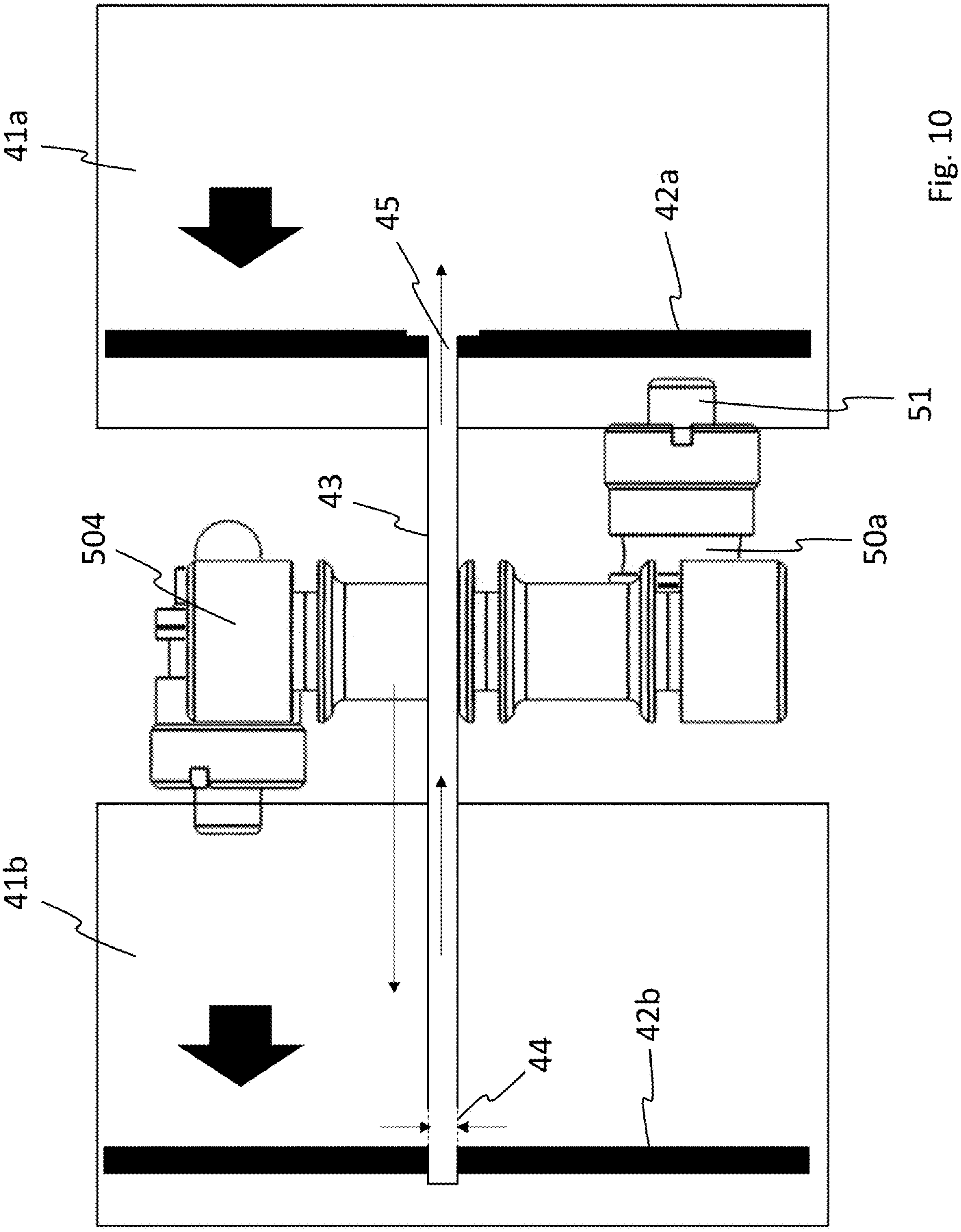

Referring to FIGS. 9 and 10, the piston control shall be explained in more detail using a schematic diagram.

In this illustration, the pistons 42*a*, 42*b* are located shortly before the end of a reset cycle.

Slide valve 504 is in a position in which compressed air is only fed into working chamber 41*a*. This resets piston 42*a* and thus also piston 42*b*.

As soon as the piston 42*b* presses on the tappet 51, the control valve 50*b* opens and the slide valve 504 moves in the direction indicated by an arrow.

FIG. 10 now shows how the slide 504 moves into the position in which compressed air now flows into the working chamber 41*b* of the piston 42*b*.

In this working cycle, compressed air can flow from the working chamber 41*b* via inlet 44 through connecting passage 43 and flow via an outlet into the working chamber 41*a* of piston 42*a*.

Therefore, both working chambers 41*a*, 41*b* are supplied with compressed air during a working cycle.

What is shown here is the position of the pistons 42*a*, 42*b* shortly before the end of a working operation. Piston 42*a* is located in front of the tappet 51 of control valve 50*a*.

When the piston 42 moves even further forward, the control valve 50*a* will be opened and the slide valve 504, driven by compressed air, will move back to the position shown in FIG. 9 in order to initiate a reset cycle.

Figure 11:
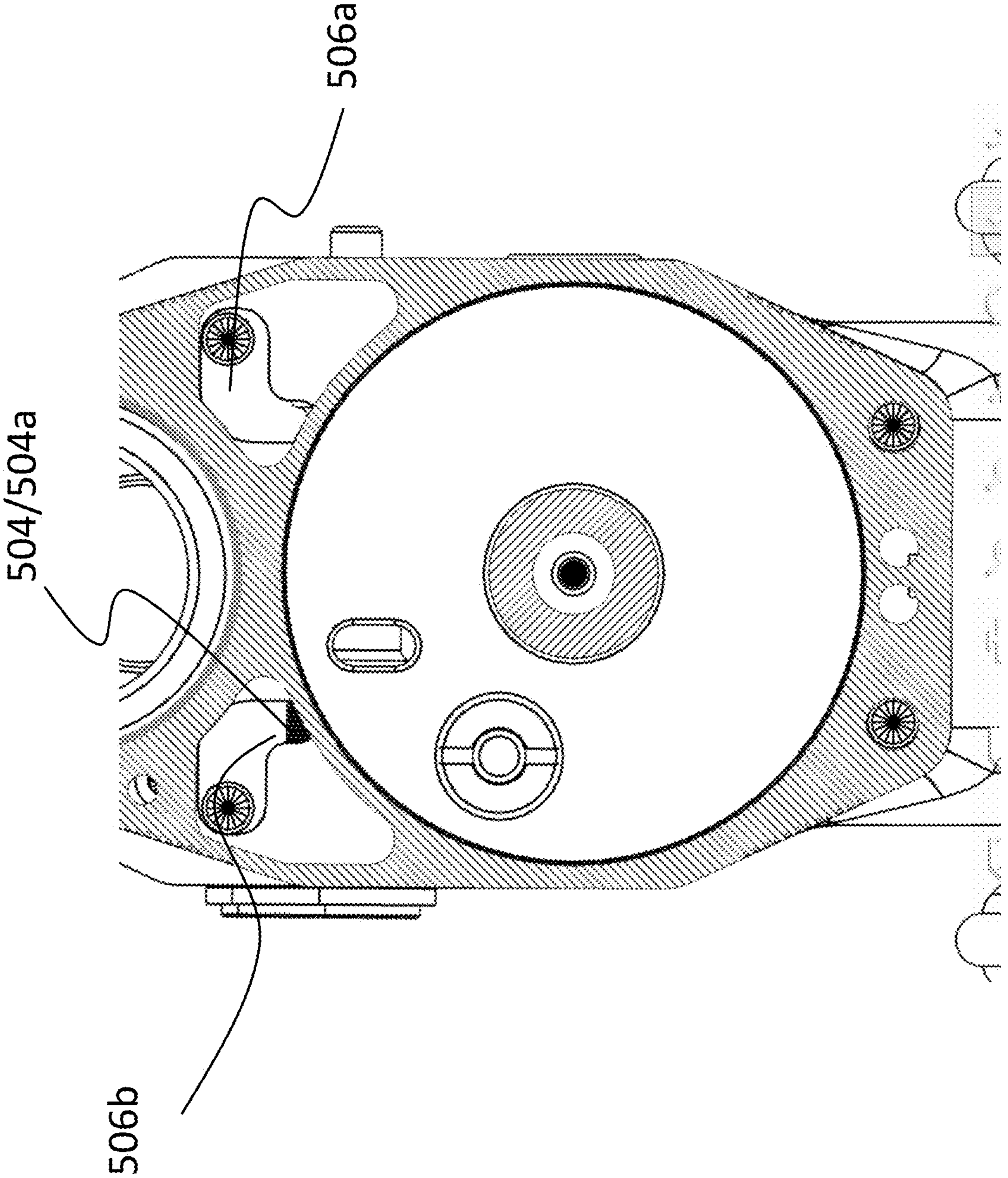
FIG. 11 is a cross-sectional view by way of which the switching over of the exhaust air shall be explained.

FIG. 11 is a further cross-sectional view in the area of slide valve 504. The passage 506*b* for the exhaust air coming from the first working chamber is closed by section 504*a* of slide valve 504.

When slide valve 504 is moved to the right position in this view via a control valve, the passage 506*b* will be opened and the passage 506*a* from the second working chamber will be closed.

The exhaust air is discharged via passages in the housing, in particular preferably via an expansion silencer.

Figure 12:
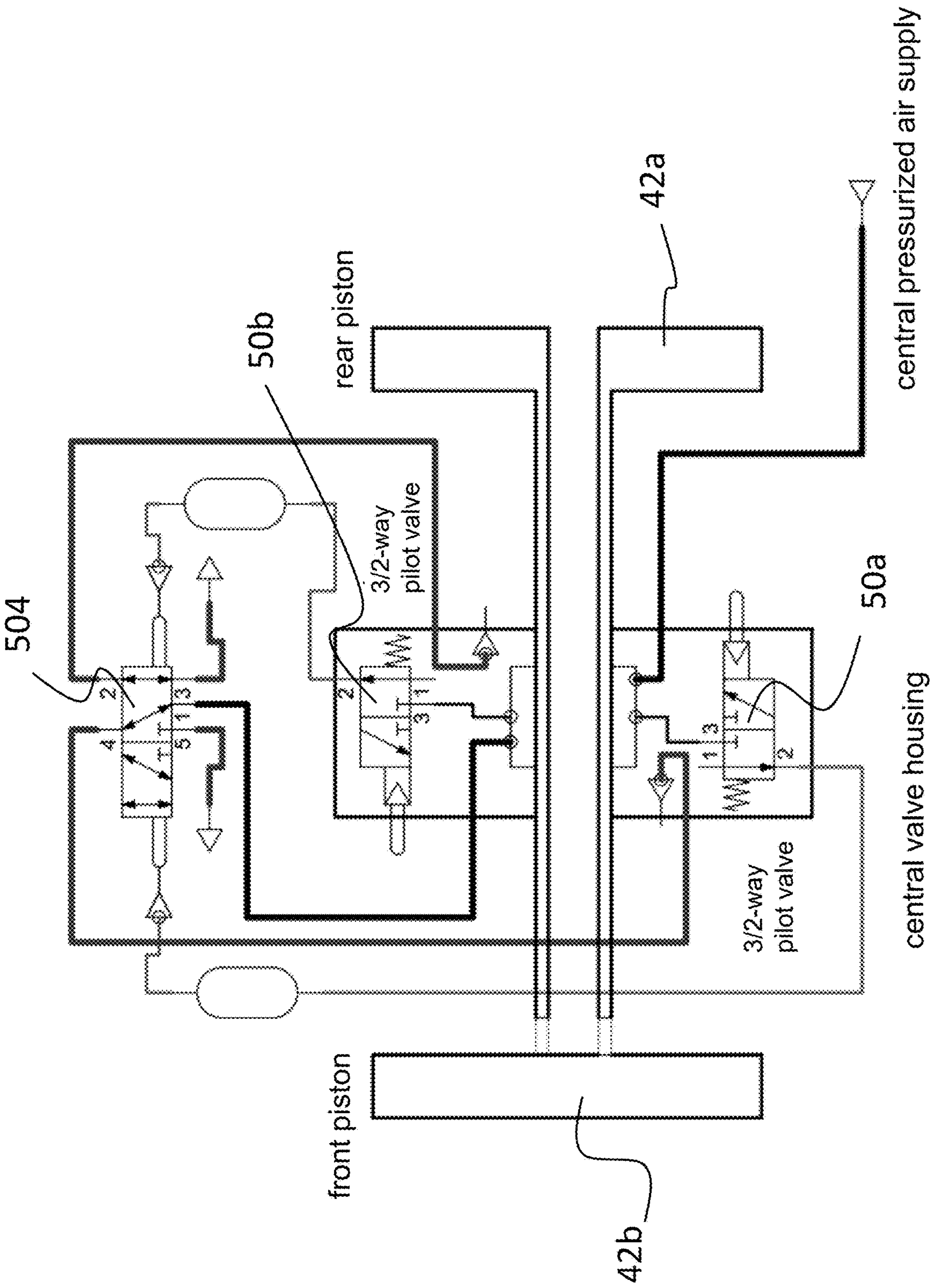
FIG. 12 is an equivalent circuit diagram of the pneumatic piston control.

FIG. 12 is an equivalent circuit diagram of the piston control. The central compressed air supply is looped through to the directional valve or slide valve 504.

Through the directional valve, compressed air is alternately fed into the front and rear working chambers, and at the same time the working chamber is opened and closed in the reverse order.

The control valves 50*a*, 50*b* are in the form of 3/2-way valves and are used to switch over the slide valve 504. Whenever a piston 42*a*, 42*b* hits a control valve 50*a*, 50*a*, compressed air will be fed into the slide valve's working chamber (503 in FIG. 5). This compressed air is introduced in such a way that the slide valve 504 switches over in each case, i.e. moves to the right or left.

Figure 13:
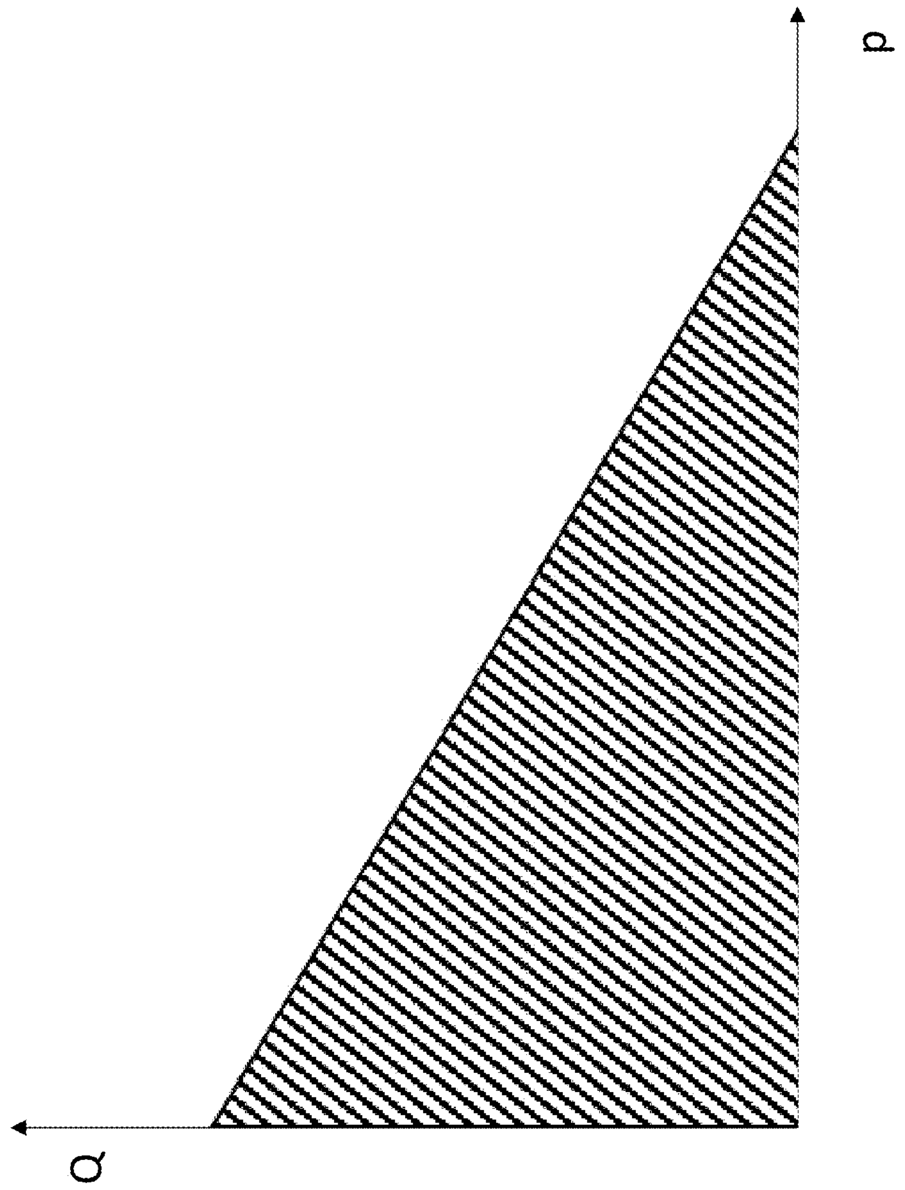
Fig. 13 Prior art
FIG. 13 schematically illustrates the relationship between volume flow and pressure according to a prior art pressure intensifier.

FIG. 13 schematically shows the ratio of volume flow Q in relation to the pneumatic pressure p in the pneumatic area, as is the case with a prior art pressure generator as mentioned above.

In the case of an upstream control, the volume flow Q decreases with increasing pressure p in the pneumatic area. It goes without saying that the decrease does not necessarily have to be linear as shown here.

The area under the curve is the hydraulic output power during a working operation.

Figure 14:
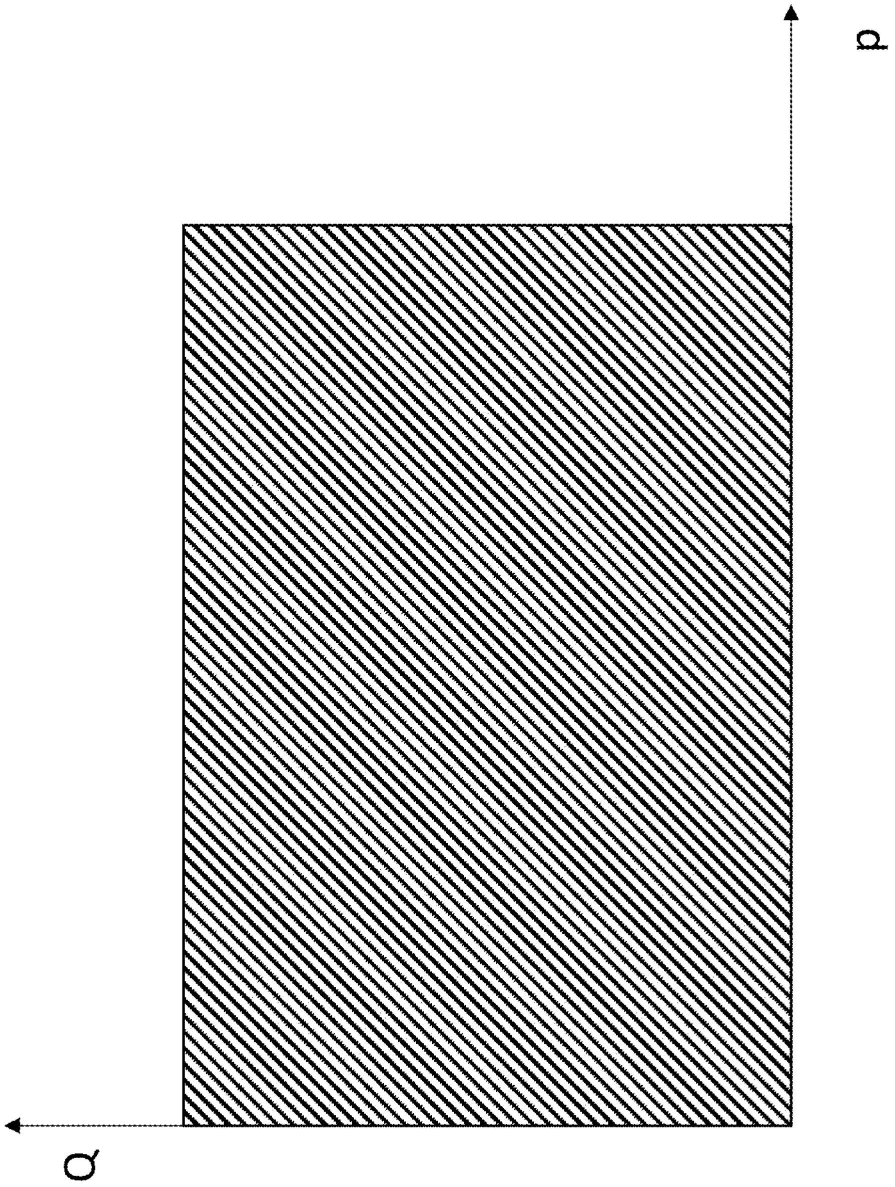
FIG. 14 schematically illustrates the relationship between volume flow and pressure in the pressure intensifier.

However, as shown in FIG. 14, the volume flow Q theoretically does not change until the maximum pressure is reached.

Instead, the volume flow Q will be set to zero by the pilot control valve when a maximum pressure is reached.

It has been shown that this allowed to approximately double the hydraulic power.

Figure 15:
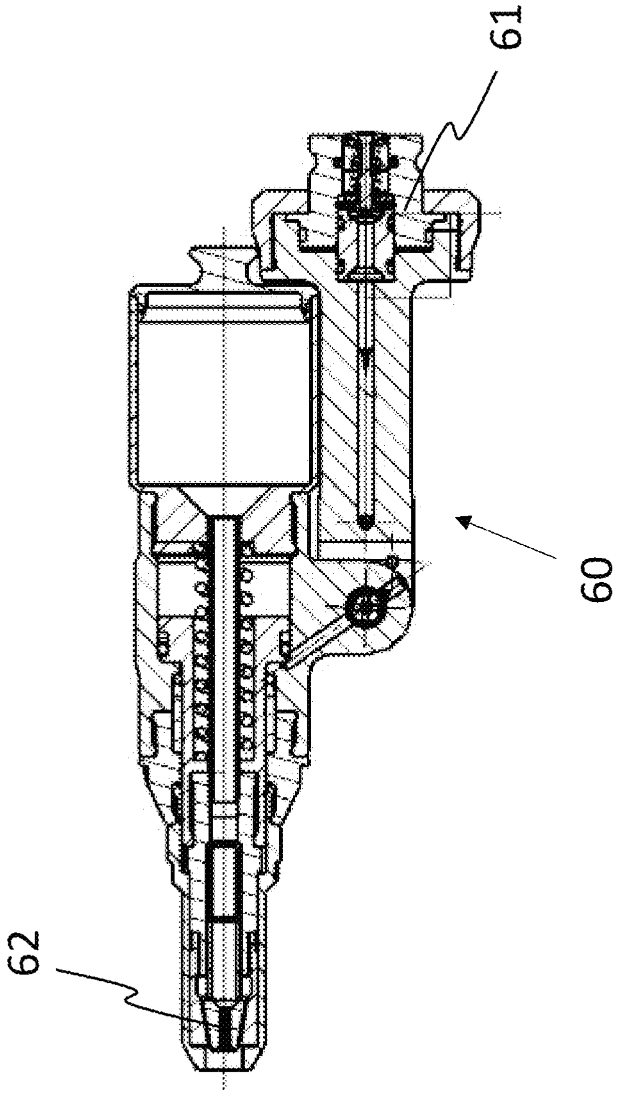
FIG. 15 is a longitudinal sectional view of an exemplary tool application.

FIG. 15 is a longitudinal sectional view of an exemplary tool application 60.

In this exemplary embodiment, the tool application 60 is in the form of a blind rivet adapter. The tool application 60 comprises a quick release coupling 61, via which it can be coupled to the pressure generator.

In this exemplary embodiment, the tool application 60 comprises a pulling device 62 for pulling blind rivets.

However, the pressure generator can also be coupled with other tool applications, for example with riveting arms, spreading and crimping devices, etc. Due to the high hydraulic output power, it is also conceivable for the pressure intensifier to be used for hydroforming, for example.

LIST OF REFERENCE NUMERALS

1 Pressure intensifier
2 Housing
3 Pneumatic connection
10 Handle
11 Trigger
12 Linkage
20 Quick release coupling
21 Locking ring
22 Ball
23 Cage
24 Self-closing valve
30 Diaphragm
40 Tandem piston
41*a* Working chamber
41*b* Working chamber
42*a* Piston
42*b* Piston
43 Connecting passage
44 Inlet
45 Outlet
50*a* Control valve
50*b* Control valve
51 Tappet
60 Tool application
61 Quick release coupling
62 Pulling device
100 Main valve
101 Pin
102 Valve body
103 Shut-off valve
104 Outlet
105 Inlet
106 Control line (fast forward)
107 Control line (pilot control valve)
108 Control line (relief valve)
109 Line (for piston control)
200 Pilot control valve and control
201 Control member
202 Pin
203 Base of pneumatic valve
204 Spring
300 Hydraulic pump
301 Hydraulic piston
302 Pressure valve
303 Suction valve
304 Cover
305 Hydraulic line
306 Diaphragm
400 Relief valve
401 Valve body
402 Spring
403 Lever
404 Piston
500 Piston control
503 Working chamber (slide valve)
504 Slide valve
504*a* Section (open/close exhaust air)
504*b* Section (open/close compressed air)
505*a* Passage to first working chamber (compressed air)
505*b* Passage to second working chamber (compressed air)
506*a* Passage from first working chamber (exhaust air)
506*b* Passage from second working chamber (exhaust air)

What is claimed is:

1. A pneumohydraulic pressure intensifier (1), comprising:
- a hydraulic pump (300), including
  - a hydraulic piston (301),
  - a pressure valve (302) configured to open when the hydraulic piston (301) is advanced and hydraulic fluid is pushed out of the hydraulic pump (300) through the pressure valve (302), and
  - a suction valve (303) configured to open when the hydraulic piston (301) is retracted and hydraulic fluid flows into the hydraulic pump (300) through the suction valve (303) while the pressure valve (302) is closed;
- a pneumatic piston (42*a*, 42*b*) coupled to the hydraulic pump (300);
- a hydraulic pilot control valve (200) adapted to interrupt an air supply to the pneumatic piston (42*a*, 42*b*); and
- a regulator configured to set a hydraulic output pressure;
- wherein the regulator is coupled to the hydraulic pilot control valve (200) and adapted to interrupt the air supply to the pneumatic piston (42*a*, 42*b*) when a set maximum hydraulic output pressure is reached.

2. The pneumohydraulic pressure intensifier (1) as in claim 1,
- wherein the hydraulic pilot control valve (200) is coupled to a pneumatic valve (203), and
- wherein the pneumatic valve (203) opens or closes a pneumatic control line (107) leading to a main valve (100).

3. The pneumohydraulic pressure intensifier (1) as in claim 2,
- wherein the main valve (100) is a 5/2-way valve or a 5/3-way valve.

4. The pneumohydraulic pressure intensifier (1) as in claim 1,
- wherein the hydraulic pump (300) feeds hydraulic fluid when the pneumatic piston (42*a*, 42*b*) is advanced, and
- wherein the pneumatic piston (42*a*, 42*b*) can be reset by pneumatic pressure via a control valve (504).

5. The pneumohydraulic pressure intensifier (1) as in claim 4,
- wherein the pneumatic piston (42*a*, 42*b*) is a tandem piston (40) including
  - a first piston (42*a*) and
  - a second piston (42*b*) coaxially arranged with the first piston (42*a*), and
- wherein in a working cycle the first and second pistons (42*a*, 42*b*) are advanced by introduction of compressed air.

6. The pneumohydraulic pressure intensifier (1) as in claim 5,
- wherein the compressed air is fed into a working chamber (41*b*) of the second piston (42*b*) and through a passage (43) which connects the first piston (42*a*) to the second piston (42*b*).

7. The pneumohydraulic pressure intensifier (1) as in claim 5,
- wherein the tandem piston (40) can be reset by introducing the compressed air into a working chamber (41*a*) of the first piston (42*a*).

8. The pneumohydraulic pressure intensifier (1) as in claim 5, wherein a pneumatic control module is arranged between a first working chamber (41*a*) of the first piston (42*b*) and a second working chamber (41*b*) of the second piston (42*b*).

9. The pneumohydraulic pressure intensifier (1) as in claim 8, wherein the pneumatic control module comprises a first control valve (50*a*) leading into the first working chamber (41*a*), and a second control valve (50*b*) leading into the second working chamber (41*b*).

10. The pneumohydraulic pressure intensifier (1) as in claim 9, wherein the first control valve (50*a*) and the second control valve (50*b*) are adapted to actuate a directional control valve, and wherein the directional control valve directs the compressed air either into the first working chamber (41*a*) of the first piston (42*a*) or into the second working chamber (41*b*) of the second piston (42*b*).

11. The pneumohydraulic pressure intensifier (1) as in claim 1, wherein the pneumohydraulic pressure intensifier (1) is a portable hand-held device.

12. A pressing or pulling tool selected from the group consisting of a riveting tool, a punching tool, a crimping tool, a spreading tool, and a cutting tool, the pressing or pulling tool comprising the pneumohydraulic pressure intensifier (1) as in claim 1.

* * * * *